Patented Feb. 5, 1935

1,990,343

UNITED STATES PATENT OFFICE 1,990,343

PROCESS FOR PREPARING FOOD FOR SILK WORMS

Kunimaro Naruse, Tairen, Japan

No Drawing. Application January 21, 1932, Serial No. 588,032. In Japan February 6, 1931

1 Claim. (Cl. 99—11)

My invention relates to improvements in process for preparing food for silk worm to be used in place of mulberry leaves the only stuff for feeding silk worm.

The object of the invention is firstly to economize the cost of food, secondly to reduce the labour for feeding, thirdly to spare mulberry fields, fourthly to increase the production of silk, fifthly to industrialize the seliculture and in summing up to economize the rate of production and reduce the cost of raw silk.

According to the present invention the chief matter of food containing proteid substance, fatty matter, fibrous matter, hydro-carbons free from nitrogen, ash and water is obtained from a suitable material, and appetizing agent is added thereto to prepare the food and silk worms are fed thereby in place of mulberry leaves.

Said chief matter is made from soja-bean. Soja-bean is washed and dipped in water about 50 hours. When the hull of the bean is soaked and the body is softened it is ground with plenty of water by the grinder and the ground juice is boiled in a pan removing the foam produced while boiling. The boiled juice is then put in a canvas sack and milky juice is squeezed out by pressure. A caky matter containing proteid substance, fatty matter, fibrous matter, hydro-carbons free from nitrogen, ash and water remains in the sack which is to be used as the chief matter.

As for the appetizing agent some quantity of mulberry leaves or buds are milled to squeeze the juice which juice is poured on affore said caky substance by an atomizer. The substance then is mixed and is put in a closed vessel for 2 hours or more and when the flavour of the appetizing agent is quite absorbed on the chief matter it is scattered on the mat to feed the silk worm. The food is well adapted for the health of silk worm and excellent cocoons may be obtained therefrom.

The quantity of appetizing agent to the chief matter is 5 percent or some abouts. At the season when natural mulberry leaves or buds can not be obtained mulberry twigs cut one or two inches long are placed on sand in a hothouse or pit under a proper temperature and humidity for some 7 or 8 days to be quickly germinated and the buds are collected to be squeezed, which juice is quite similar to those obtained from natural leaves or buds as the appetizer.

Having now particularly described and ascertained the nature of my said invention and in what manner the same is to be performed I declare that what I claim is:—

In a process for preparing food for silk worms, the step of adding to soja-bean curdy matter containing protein, fatty matter, fibrous matter, nitrogen free hydro-carbons, ash and water, and mulberry leaves juice squeezed from leaves or buds, as appetizing agent for the worm.

KUNIMARO NARUSE.